C. K. GREENLEAF.
LIGHT DIMMER.
APPLICATION FILED MAR. 2, 1915.
1,167,748. Patented Jan. 11, 1916.
2 SHEETS—SHEET 1.
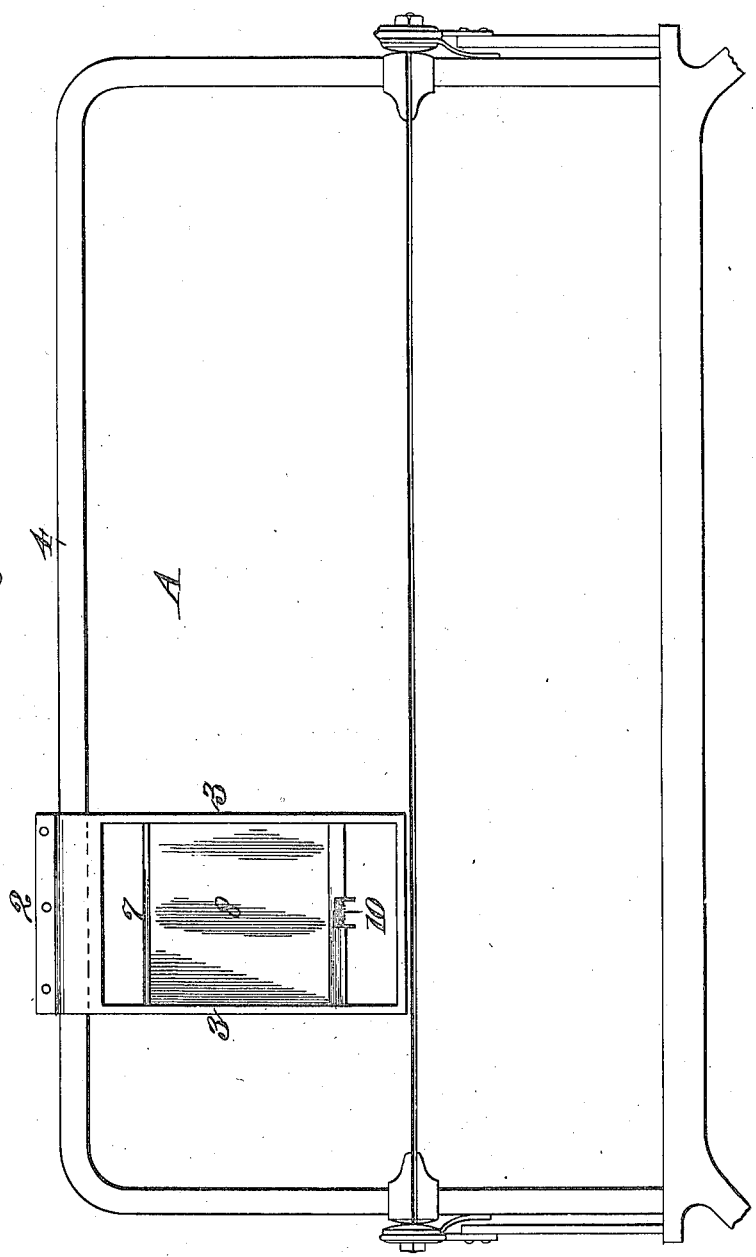
WITNESSES:
Charles Robles
Thos Castberg
INVENTOR
Carl K. Greenleaf,
BY G. H. Strong,
ATTORNEY

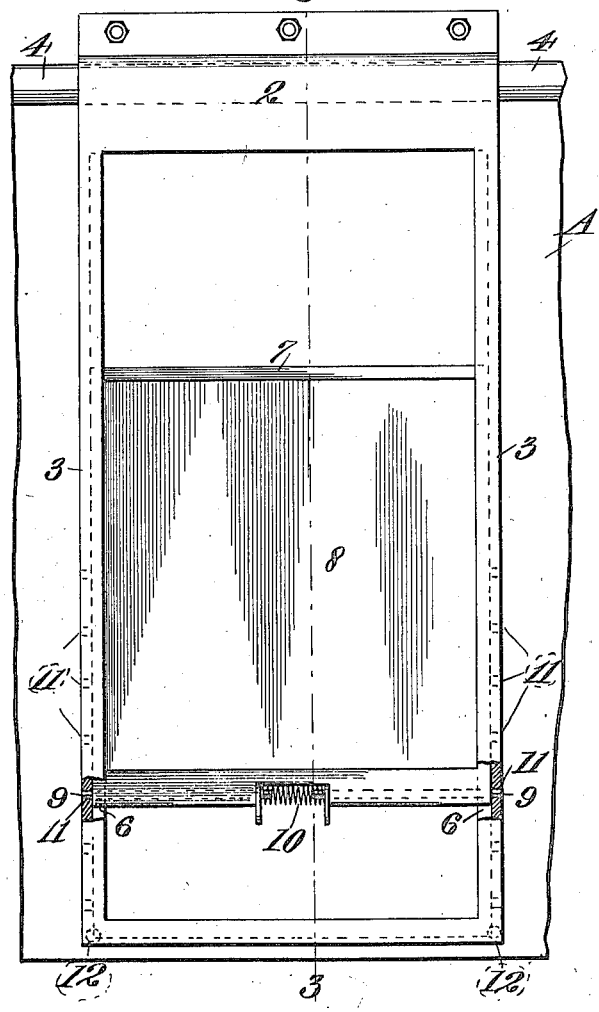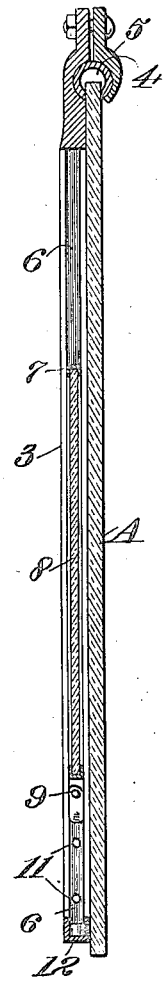

UNITED STATES PATENT OFFICE.

CARL K. GREENLEAF, OF SANTA CLARA, CALIFORNIA.

LIGHT-DIMMER.

1,167,748. Specification of Letters Patent. Patented Jan. 11, 1916.

Application filed March 2, 1915. Serial No. 11,456.

*To all whom it may concern:*

Be it known that I, CARL K. GREENLEAF, a citizen of the United States, residing at Santa Clara, in the county of Santa Clara and State of California, have invented new and useful Improvements in Light-Dimmers, of which the following is a specification.

This invention relates to a light dimmer. One of the objects of the present invention is to provide a light dimmer for shielding the eyes of a driver of an automobile against the glare or dazzling headlights of approaching automobiles, street cars, locomotives, or the like, so that the driver can see to properly direct the vehicle.

Another object of the invention is to provide means for securing the dimmer to the wind-shield of the car either on the right or left-hand side, and to provide means for adjusting same vertically to intersect the line of vision.

Further objects will hereinafter appear.

The invention consists of the parts and the construction and combination of parts as hereinafter more fully described and claimed, having reference to the accompanying drawings, in which—

Figure 1 shows the application of the dimmer to the wind-shield of an automobile. Fig. 2 is an enlarged view of the dimmer, showing its application to the wind-shield. Fig. 3 is a central, vertical section on line 3—3, Fig. 2.

More particularly described, A indicates the wind-shield of an automobile and 2 the dimmer. The dimmer proper consists of a rectangular shaped frame 3 which is secured to the wind-shield frame 4 by means of the clamping bracket, indicated at 5. This securing means permits frame 3 to be secured either on the right or left-hand side of the wind-shield or at any intermediate point. Frame 3 is otherwise channeled on each side, as indicated at 6, to receive a sliding frame 7 which incloses a glass 8, said glass being smoked or colored to dim or soften the dazzling light rays projected by the headlights of approaching machines.

Suitably secured on the lower end of the sliding frame is a pair of outwardly extending spring-actuated latch members 9 which are adapted to be projected by a spring 10 into perforations 11 formed in the sides of frame 3. The provision of the latches permits frame 7 to be raised or lowered within the main frame 3 and also to be secured or locked in any desired position. All drivers of automobiles do not use the same line of vision and all makes of machines do not seat the drivers the same. The vertical adjustment of the sliding frame permits this to be raised or lowered, or, in other words, adjusted to intersect the line of vision of the driver.

The dimmer is preferably mounted on the inside of the wind-shield and, as before described, is secured to same by means of the clamp 5. The lower end of the dimmer frame is provided with a rubber bumper 12 which contacts with the glass, thus preventing rattling or marring of the wind-shield glass surface. The dimmer constructed as here shown does not only make it safer to drive against bright and dazzling lights, but is also very restful and necessary as it softens glaring sunlight reflected by snow or sand. The dimmer, although always in position, is of such a size that the operator has a clear vision around or above same at all times as well as its protection against objectionable glare and it may, furthermore, be raised or lowered entirely out of the way by releasing the spring latches.

The materials and finish of the several parts of the device are such as the experience and judgment of the manufacturer may dictate.

I wish it understood that various changes in form, proportions and minor details of construction may be resorted to within the scope of the appended claim, and that I do not wish to limit myself to the specific design and construction here shown.

Having thus described my invention, what I claim and desire to secure by Letters Patent is—

The combination with the wind-shield of an automobile, of a frame provided with apertures, a clamping member for securing said frame to the wind-shield, a sliding frame mounted in said frame, a colored glass mounted in the sliding frame, and a pair of spring actuated latches on the sliding frame, said latches being adapted to be projected into the apertures formed in the first-named frame to support and lock the sliding frame.

In testimony whereof I have hereunto set my hand in the presence of two subscribing witnesses.

CARL K. GREENLEAF.

Witnesses:
W. W. HEALEY,
M. E. EWING.